July 3, 1951  J. R. WILLIAMS  2,559,527
GAS BURNER AND FLAME SHIELD
Filed Nov. 3, 1948
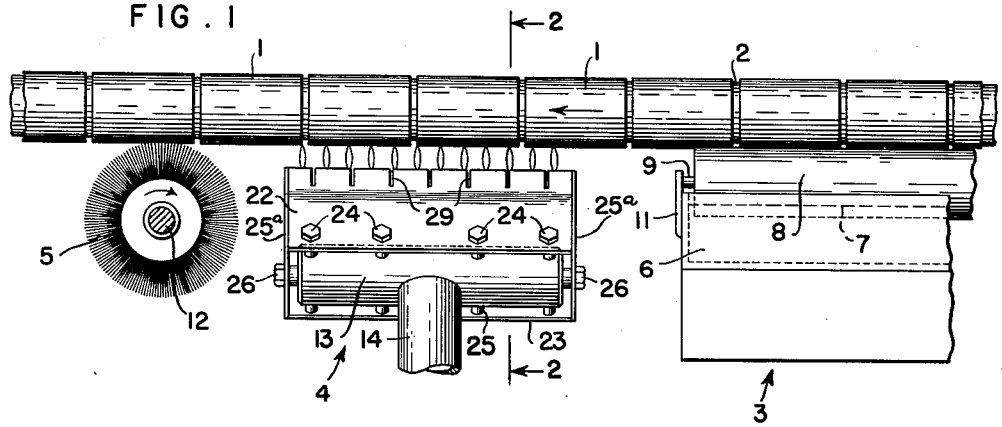
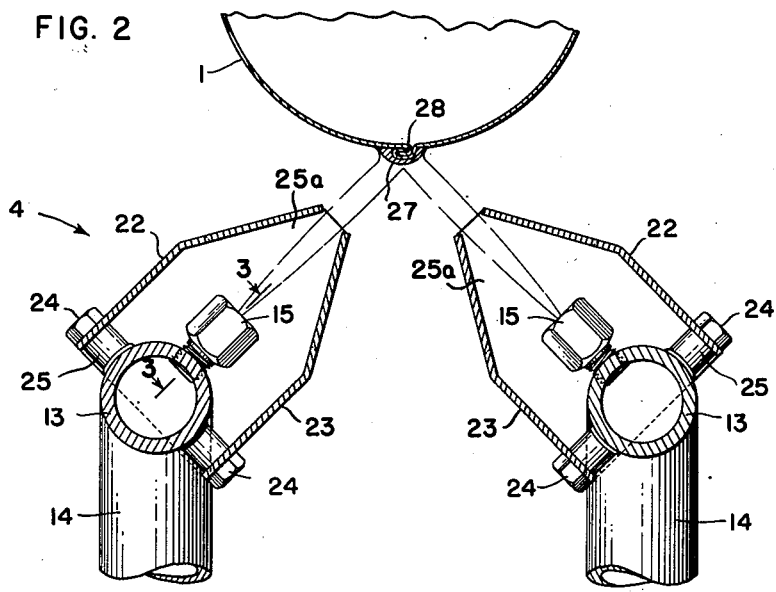
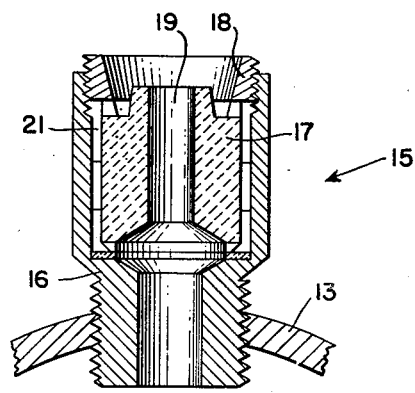
INVENTOR.
JOHN ROGER WILLIAMS
BY E. Wellford Mason
ATTORNEY.

Patented July 3, 1951

2,559,527

UNITED STATES PATENT OFFICE 2,559,527

GAS BURNER AND FLAME SHIELD

John Roger Williams, Ambler, Pa., assignor to Selas Corporation of America, Philadelphia, Pa., a corporation of Pennsylvania Application November 3, 1948, Serial No. 58,148

1 Claim. (Cl. 158—99)

The present invention relates generally to gas burners, and more particularly to a shielded gas burner in which the burner ports are so protected that dirt or other foreign matter cannot clog them.

In the manufacture of cans the metal blanks for the body are bent to the desired shape, usually cylindrical, and the edges thereof are locked together. The cylindrical shapes are then fed through a machine that applies solder to the seam along the locked edges. The solder is applied over the general area of the seam and presents an unsightly surface. Consequently, the formed can bodies are moved past a stiff brush which is used to remove the excess solder and leave a clean, neat seam. Since the solder will normally freeze between the time it is applied to the can bodies and the time they are moved past the brush it is usual to apply a flame or flames to the can seams immediately in front of the brush to soften the solder to an extent where the brush can be effective. Because of the fact that the burners producing the flames are located immediately in front of the brush trouble has been encountered in this operation due to clogging of the burners with small particles of solder removed from the can bodies. In actual practice the burners become so clogged that it is frequently necessary to change them one or more times during an eight hour shift.

It is an object of the present invention to provide a burner to be used in front of the cleaning brush of a can body forming machine that is so shielded that the small particles of solder removed from the can cannot clog the burner ports.

It is a further object of the invention to provide a shielded burner to be used in can body manufacture that will project one or more flames on the soldered seam of the body so that it can flow into the seam to form a tight joint.

It is a further object of the invention to provide a burner by means of which a series of protected flames may be directed upon work to be heated. The burner is particularly adapted to be used in any application where there is much dirt or other matter that would normally tend to clog the burner ports.

The various features of novelty which characterize my invention are pointed out with particularity in the claim annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

Figure 1 is a somewhat diagrammatic showing of a portion of a can forming machine;

Figure 2 is a view of the burner of the invention taken on line 2—2 of Figure 1; and Figure 3 is a section through one of the burner port units taken on line 3—3 of Figure 2.

In the drawings there is shown a portion of a can forming machine that is used to solder seams formed along the side of a can body. The blanks of tin plate are bent to a circular form and the edges thereof are crimped and locked together. These cylindrical can bodies 1 are then moved to the left in Figure 1 in rapid succession along a rod or horn 2. The bodies move in succession past a seam soldering device 3 and a burner or burners 4 before they reach a cleaning brush 5. From there the can bodies move on to machinery which performs other operations on them. The seam soldering device consists of a heating tank 6 that is filled with molten solder to a level shown at 7, which is near the top of the tank. Dipping into this tank and below the surface of the solder is a rotating cylinder 8 that picks up the solder and deposits it as shown at 27 along the seams 28 of the can bodies, said seams being positioned at the bottom (Figure 2) as they move along the rod 2. Cylinder 8 is shown as being mounted on a shaft 9, the left end of which is journalled for rotation in a bracket 11 extending upwardly from the tank 6. The other end of the cylinder is suitably supported and is rotated by a means, not shown, to carry the solder from the tank to the seams of the cans.

In the operation of the soldering machine there is generally placed on the seam of a can more solder than is necessary and the excess solder has to be removed in order for the can to present a pleasing appearance. The excess solder is removed by the brush 5 which is mounted on a shaft 12 that is rotated in a direction counter to the movement of the can bodies. The solder usually has a tendency to freeze between the time the can bodies leave the roller 8 and the time that they reach the brush 5. For this reason there is provided a burner or burners which are used to heat the seam of the can body and to keep the solder in a liquid or plastic form. This burner also serves the purpose of maintaining the solder liquid long enough for it to flow deeply into the seam of the can so that a tight joint will be obtained. A single burner may be used if desired but normally two burners are used to play against the seam of the can, as is best shown in Figure 2 of the drawing. Each burner includes a manifold 13 supplied by means of a pipe 14 with a combustible mixture of gas and air. The burner may also be supported by the pipe. Each burner also has a plurality of burner port units 15 that may be of a standard type. The number of these burner port units can be varied depending upon the application to which the burner is put. In any event a sufficient number of flames will be played upon the seams of the can bodies to keep the solder in a soft enough condition for the excess solder to be brushed off the seam and for the solder to flow deeply into the joint.

As is shown in Figure 3 each of the flame port units 15 consists of a body 16 that is recessed to receive a ceramic plug 17 which is held in the body by a ring 18 that is threaded into the outer end of the body. The plug 17 is provided with a central opening 19 from which the flame projects. The plug is further provided around its edge with supports or projections that engage the interior of the body 16 so that channels 21 are formed between the plug and the interior of the body, through which gas flows to form a pilot flame.

As is best shown in Figure 2 of the drawing, two of the burners 4 are used, and they are laterally displaced from the center of the can bodies 1. The burner port units 15 are threaded into the manifold 13 at such an angle to the vertical that a flame produced by them will strike the covering of solder 27 which has been placed around the seam 28 of the can. Enough of the burner port units are used in each of the burners to keep the solder soft enough for removal. As the brush 5 cleans the cans of the excess solder small droplets of this solder are thrown over the surroundings. If some means were not provided for protecting the ports of the burner units they would soon become filled with these droplets of solder and clogged up to such an extent that replacement would be necessary. A means is therefore provided to protect the ports 19, and therefore prevent them from becoming too clogged to be useful. To this end there is provided an upper shield 22 and a lower shield 23 that are fastened to the manifold 13 by means of bolts 24 extending through spacing members 25 which are welded to the manifolds. As shown herein the burner ports and the shields extend from manifold at an angle approximately 45° to the vertical. This inclination, however, can be varied depending upon the use to which the burner is put and the particular set up that is used for any installation. The burner shields at their ends are in abutting relation to additional shielding members 25a that are held to the ends of the assembly by bolts 26.

In the operation of the device a combustible mixture of gas and air is supplied through pipe 14 to the manifolds 13. This mixture passes through the openings 19 where it is ignited to burn in a series of long narrow flames known as spear flames, shown diagrammatically in Figure 2. Because of the pressure of the gas necessary to supply these flames they would have a tendency to be blown off of the burner port if some piloting means were not provided. It is for this reason that the channels 21 are formed between the body 16 and plug 17. A small flow of the combustible mixture may go through these channels to ignite the main body of gas passing through opening 19 and keep it ignited. The flames from the burners keep the solder soft enough so that it can flow into the joints of the seam and so that the excess solder can be removed from the seam by the brush 5.

The heat from the flames is fairly intense near the outer edges of the shields 22 and 23, so that these parts would normally have a tendency to warp. For this reason there is provided a number of slots 29 in the outer inclined portion of each shield as shown in Figure 1. These slots are wide enough so that they will permit expansion of the shield to prevent warping, but narrow enough so that substantially no droplets of solder will pass through them. When the burners are operating air will be drawn between the manifold 13 and the shields 22 and 23. This air circulating around the parts of the burner will help prevent the shields from becoming too hot.

Normally the two burners will be mounted directly opposite each other. If it is desired, however, the burners could be offset axially with respect to each other so that the flames from each burner instead of striking a given point along the can bodies would strike points along the can bodies that alternate with the points of the bodies engaged by the flames from the opposite burner.

From the above description it will be seen that I have provided a burner which can be used to direct highly concentrated flames against given portions of a body. This flame is so protected by the shielding means forming part of the burner that foreign particles cannot enter into the space between the shields and clog up the burner. With ordinary burners used for this purpose it has been found that the burner ports become so clogged in the course of an eight hour shift in a can manufacturing plant that the burners must be changed one or more times. Burners of the present type being used in connection with can forming machines have operated continuously several weeks at a time without requiring cleaning.

While in accordance with the provisions of the statutes, I have illustrated and described the best form of embodiment of my invention now known to me it will be apparent to those skilled in the art that changes may be made in the form of the apparatus disclosed without departing from the spirit and scope of the invention, as set forth in the appended claim, and that in some cases certain features of my invention may be used to advantage without a corresponding use of other features.

What is claimed is:

In a burner, the combination of an elongated tubular manifold, means to supply a combustible mixture to said manifold, a plurality of burner port units each provided with an axial passage terminating in a port through which the combustible mixture may flow to be ignited, said units including means to produce a long spear type flame, said burner port units being mounted on said manifold in a row and communicating with the interior thereof and extending in a given direction, spacing members extending from the exterior of said manifold at right angles to the passage of said burner port units and on opposite sides thereof, and a shield attached to the spacing members on each side of said manifold, each shield being substantially parallel to said burner port units and extending to a plane substantially at right angles to and passing through the discharge ends of said axial passage in said burner port units, said shields converging toward each other beyond their parallel portions, the converging portions of said shields being provided with a plurality of narrow slots extending toward the converging edges thereof.

J. ROGER WILLIAMS.

REFERENCES CITED

The following references are of record in the file of this patent:

UNITED STATES PATENTS

| Number | Name | Date |
|---|---|---|
| 1,271,498 | Blanchard | July 2, 1918 |
| 1,865,904 | Hammon | July 5, 1932 |
| 1,957,587 | Hager | May 8, 1934 |

FOREIGN PATENTS

| Number | Country | Date |
|---|---|---|
| 772,290 | France | Aug. 13, 1934 |